(12) United States Patent
Tschudin

(10) Patent No.: US 12,140,460 B2
(45) Date of Patent: Nov. 12, 2024

(54) MAGNETICALLY-INDUCTIVE FLOW METER

(71) Applicant: Endress+Hauser Flowtec AG, Reinach (CH)

(72) Inventor: Beat Tschudin, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 75 days.

(21) Appl. No.: 17/756,357

(22) PCT Filed: Nov. 9, 2020

(86) PCT No.: PCT/EP2020/081435
§ 371 (c)(1),
(2) Date: May 23, 2022

(87) PCT Pub. No.: WO2021/099153
PCT Pub. Date: May 27, 2021

(65) Prior Publication Data
US 2022/0397435 A1 Dec. 15, 2022

(30) Foreign Application Priority Data
Nov. 22, 2019 (DE) ...................... 10 2019 131 671.5

(51) Int. Cl.
*G01F 1/58* (2006.01)
(52) U.S. Cl.
CPC .............. *G01F 1/586* (2013.01); *G01F 1/584* (2013.01)
(58) Field of Classification Search
CPC ............ G01F 1/586; G01F 1/584; G01F 1/56
See application file for complete search history.

(56) References Cited

U.S. PATENT DOCUMENTS

| 3,881,350 A | | 5/1975 | Nosley | |
| 5,544,532 A | * | 8/1996 | Brown ...................... | G01F 1/58 73/861.12 |

FOREIGN PATENT DOCUMENTS

| CN | 105928573 A | 9/2016 | |
| CN | 207423282 U | 5/2018 | |
| CN | 109253764 A | 1/2019 | |
| DE | 8332021 U1 | 3/1984 | |
| DE | 8707138 A1 | 8/1988 | |
| EP | 892251 A1 * | 1/1999 | ............. G01F 1/588 |
| JP | 2005180962 A | 7/2005 | |
| RU | 2652649 C1 | 4/2018 | |

* cited by examiner

*Primary Examiner* — Peter J Macchiarolo
*Assistant Examiner* — John M Royston
(74) *Attorney, Agent, or Firm* — Kelly J. Smith; Endress+Hauser (USA) Holding Inc.

(57) ABSTRACT

The disclosure relates to a magnetically inductive flow meter for insertion into a pipeline and for determining a flow-rate-dependent measurement variable induced in the medium, comprising: a housing, a front body being arranged on an end face of the housing, which front body seals the end face of the housing; a measurement electrode arrangement for forming galvanic contact with the medium and for tapping an induced voltage in the flowing medium; a field system for generating a magnetic field that passes through the end face of the housing, the field system being arranged in the housing, the field system comprising a coil arrangement, the coil arrangement comprising a coil arrangement carrier for winding a coil wire, and the coil arrangement carrier and the front body being monolithic.

14 Claims, 3 Drawing Sheets

MAGNETICALLY-INDUCTIVE FLOW METER

CROSS-REFERENCE TO RELATED APPLICATIONS

The present application is related to and claims the priority benefit of German Patent Application No. 10 2019 131 671.5, filed on Nov. 22, 2019 and International Patent Application No. PCT/EP2020/081435 filed on Nov. 9, 2020, the entire contents of which are incorporated herein by reference.

TECHNICAL FIELD

The invention relates to a magnetically-inductive flow meter and a method for producing a front body of a magnetically-inductive flow meter.

BACKGROUND

Magnetically-inductive flow meters are used for determining the flow rate and the volumetric flow of a flowing medium in a pipeline. A magnetically-inductive flow meter has a magnet system that generates a magnetic field perpendicular to the direction of flow of the flowing medium. Single coils are typically used for this purpose. In order to realize a predominantly homogeneous magnetic field, pole shoes are additionally so formed and attached that the magnetic field lines run over the entire pipe cross-section substantially perpendicularly to the transverse axis or in parallel to the vertical axis of the measuring tube. A measurement electrode pair attached to the lateral surface of the measuring tube taps an electrical measurement voltage or potential difference applied perpendicular to the direction of flow and to the magnetic field and arising when a conductive medium flows in the direction of flow when the magnetic field is applied. Since, according to Faraday's law of induction, the tapped measurement voltage depends upon the velocity of the flowing medium, the flow rate $\mu$ and, with the addition of a known pipe cross-section, the volumetric flow $\dot{V}$ can be determined from the induced measurement voltage U.

In contrast to a magnetically-inductive flow meter, which, for conducting the medium, comprises a measuring tube with an attached field system and measurement electrodes, magnetically-inductive flow meters with their usually circular-cylindrical housings are introduced into a lateral opening in a pipeline and fastened in a fluid-tight manner. A special measuring tube is no longer necessary. The measurement electrode arrangement and coil arrangement mentioned at the outset on the lateral surface of the measuring tube are omitted, and replaced by a field system arranged in the interior of the housing and in direct proximity to the measurement electrodes, which field system is designed such that an axis of symmetry of the magnetic field lines of the generated magnetic field perpendicularly intersects the front surface or the area between the measurement electrodes. In the prior art, there are already a large number of magnetically-inductive flow meters with different field systems.

EP 0 892 251 A1, for example, teaches a magnetically-inductive flow meter with a front plate, which takes the form of a spherical cap, and a coil which is pushed onto a cylindrical coil core which functions as a coil carrier. When assembling the individual components of the magnetically-inductive flow meter, the arrangement and fastening of the field system in the housing and the attachment of the front plate are carried out in separate assembly steps.

SUMMARY

The aim of the invention is to provide a corresponding method for producing a field system of the magnetically-inductive flow meter with a reduced number of assembly steps.

This aim is achieved by the magnetically-inductive flow meter according to claim 1 and the method for producing a field system according to claim 12.

The magnetically-inductive flow meter according to the invention for insertion into a pipeline through which a medium flows and for determining a flow-rate-dependent measured variable induced in the medium comprises:

a housing,
  wherein a front body which closes the housing at the end face is arranged on an end face of the housing;
a measurement electrode arrangement for forming a galvanic contact with the medium and for tapping an induced voltage in the flowing medium;
a field system for generating a magnetic field passing through the end face of the housing,
  wherein the field system is arranged in the housing,
  wherein the field system comprises a coil arrangement,
  wherein the coil arrangement comprises a coil arrangement carrier for winding a coil wire around,
  wherein the coil arrangement carrier and the front body are formed monolithically.

The housing of the magnetically-inductive flow meter usually has a cavity in which the field system, the electrical conductors, and, depending upon the application, the operating, measuring, and/or evaluation circuits are also arranged. However, the housing can also be formed as a cast body or be fully encapsulated, wherein the electrical conductors, the measurement electrodes, and the field system are also encapsulated. The housing is usually cylindrical or hollow-cylindrical, but it can also be cuboid, depending upon the application. The medium-contacting casing of the housing is usually designed to be conductive, e.g., made of metal or metalized, and serves as a reference electrode.

On the medium-contacting end face, the housing is provided with a front body which seals the interior of the housing. The front body is preferably disk-shaped. The front body seals the housing interior against the flowing medium in the pipeline.

The magnetically-inductive flow meter is to be inserted into the opening of a pipe in such a way that the front section of the housing is in direct contact with the medium to be conducted.

For detecting a flow-rate-dependent measured variable induced in the medium, a measurement electrode arrangement, in particular at least one measurement electrode in combination with a reference electrode, is required, which is electrically connected to a reference potential, in particular a ground potential. The reference electrode can be realized, for example, as a pin electrode, as a ring electrode, or also by a partially metallic housing which is connected to a reference potential—for example, a grounding system. Commercially available magnetically-inductive flow meters, however, have two measurement electrodes which are arranged on a measurement electrode axis and are arranged on the medium-contacting end face of the front body, wherein the magnetically-inductive flow meter is to be arranged in the opening of a pipe in such a way that the measurement electrode axis preferably runs perpendicular to the flow direction of the medium.

A measurement electrode arrangement consisting of at least two measurement electrodes can already be pre-assembled for the production of the magnetically-inductive flow meter, i.e., the at least two measurement electrodes are connected to each other via a connecting body. Such a measurement electrode arrangement is then inserted into the mold of an injection-molding system and is co-encapsulated with the front body. Alternatively, through-holes can be provided in the front body, into which the measurement electrodes, which are usually designed as tip electrodes, are pressed. Magnetically-inductive flow meters with more than three measurement electrodes are known.

The coil arrangement can comprise exactly one coil or several coils. A coil usually comprises a coil arrangement carrier with an opening and at least one coil wire wound around the coil arrangement carrier. The opening in the coil arrangement carrier is preferably designed such that a field guidance body, e.g., in the form of a coil core and/or a field return, can be inserted in a form-fitting manner. The magnetically-inductive flow meter according to the invention preferably comprises exactly one coil.

According to the invention, the front body and the coil arrangement carrier are designed monolithically. That is to say, the front body and the coil arrangement carrier are formed from one body, and there is no connection point, i.e., the two components are seamlessly connected to each other. This is usually realized by an injection-molding process. The field system is thus mounted in the housing, and the housing is closed off with the front body in a single assembly step.

Advantageous embodiments of the invention are the subject matter of the dependent claims.

One embodiment provides that the coil arrangement have a first contacting body arrangement,
wherein the contacting body arrangement comprises a first contacting body and a second contacting body,
wherein a first coil wire end of the coil wire is connected to a first section of the first contacting body,
wherein a second coil wire end of the coil wire is connected to a first section of the second contacting body.

The contacting body arrangement can be realized by pre-assembled contacting bodies which are connected by a connecting body. Such a contacting body arrangement simplifies the installation of the contacting bodies in the mold of an injection-molding system. The contacting body arrangement can also comprise individual contacting bodies which are not pre-assembled.

The contacting bodies serve to connect the delicate coil wire easily to an operating circuit. For this purpose, the coil wire ends are connected to the first section of the respective contacting body or wound around the first sections. A contacting device electrically connects the contacting body to the operating circuit. The coil wire is thus not connected directly to the operating circuit, but instead is interposed by the contacting body, which results in a simplification of the contacting during the assembly of the individual components of the magnetically-inductive flow meter.

The contacting body is preferably designed as a bent sheet metal part. In addition, the first contacting body and the second contacting body are preferably identical parts.

One embodiment provides that the respective first section of the first contacting body and of the second contacting body have a longitudinal axis which lies in each case in a cross-sectional plane of the coil arrangement carrier.

In the event that the coil arrangement and the coil arrangement carrier have a common longitudinal axis, it is particularly advantageous if the longitudinal axes of the respective first sections of the contacting body lie substantially in a common cross-section of the coil arrangement carrier. When the coil wire is being automatically wound onto the coil arrangement carrier, the coil wire end is first attached to the first section of the first contacting body, after which the coil wire is wound. This is done by moving a winder device in the longitudinal direction of the coil arrangement carrier or by moving the coil arrangement carrier in the longitudinal direction. After winding has ended, the coil wire is attached to the first section of the second contacting body. The production method ends with an immersion of the first sections into a solder bath. Such a production method can be easily automated.

The first section of the contacting body can be arranged on an end face of the coil arrangement carrier. According to a preferred embodiment, the contacting bodies are arranged parallel to each other. According to a further embodiment, the first sections of the contacting bodies are arranged in a center piece which connects the coil arrangement carrier and the front body to each other.

The first sections of the two contacting bodies can also be arranged offset in the longitudinal direction to the coil arrangement carrier.

One embodiment provides that the first contacting body and the second contacting body each have a second section which is connected in a form-fitting manner to the coil arrangement carrier and is preferably enclosed by the coil arrangement carrier, in particular embedded in a polymer matrix forming the coil arrangement carrier.

It is advantageous if the contacting bodies can be connected to the coil arrangement carrier in a form-fitting manner—for example, by attachment in a recessed depression in the coil arrangement carrier.

It is particularly advantageous if the contacting body has a second section which extends into the interior of the coil arrangement carrier or which is enclosed by the body of the coil arrangement carrier so that a form-fitting connection fastens the contacting body on the coil arrangement carrier. A connection of this kind can preferably be realized by encapsulating the contacting body arrangement during injection molding of the front body and the coil arrangement carrier.

The coil arrangement carrier can also comprise a center piece in which the second section is arranged.

One embodiment provides that the first contacting body and the second contacting body in the second section each have a longitudinal axis which is inclined to the longitudinal axis of the first section and/or to the longitudinal axis of the coil arrangement carrier.

As a result, the second section extends spatially away from the first section, whereby a more stable fastening of the contacting body arrangement or of the individual contacting elements to the coil arrangement carrier is realized.

One embodiment provides that the first contacting body and the second contacting body each have a third section for contacting the coil wire to an operating circuit.

In this case, the second section is located between the first section and the third section. The first section is used for attaching and fastening the coil wire. The third section serves for this and is designed in such a way that an operating circuit can be electrically connected via a contacting device. The middle third section serves to divert the third section spatially away from the first section.

Measurement circuits in the field of flow measurement technology are sufficiently known. The aim of the measurement circuit is to detect very small absolute values and changes in the respective measurement variable. There are a variety of different embodiments, each with their advantages and disadvantages.

A measurement circuit therefore comprises an analog/digital converter which converts the incoming signals—in this case, the potential difference currently present at the respective measurement electrode pair or the electrical potential prevailing at the respective measurement electrode—into digital data, which are then further processed or stored by an evaluation circuit. However, other measuring converters or measuring transducers from the field of digital measurement technology are also known and suitable for detecting a measurement voltage or an electrical potential.

The evaluation circuit is configured to process the measured values of the respective measured variables measured by the measurement circuit and to determine the measured variable sought. An evaluation circuit therefore usually comprises microprocessors, amplifiers, and noise filters. The measurement and evaluation circuit can be of modular design and can communicate by means of a wireless connection, or can be part of a single electronic measurement and evaluation unit, which is arranged in a housing of the flow meter.

One embodiment provides that the measurement electrode arrangement be arranged in the front body,
wherein the measurement electrode arrangement has two measurement electrodes, each having an end section for connecting the measurement electrodes to a measurement circuit,
wherein the end section is arranged in the housing.

The contacting bodies here extend up to an end face, located in the interior of the housing, of the front body, where the end sections of the measurement electrodes are located. According to the embodiment, the end sections of the measurement electrodes and the third sections of the contacting elements lie in a common cross-section. This simplifies not only the attachment of the contacting device, via which an electrical connection to the operating circuit is established, but also opens up the possibility of connecting the end sections and third sections to the measurement and/or operating circuit via a single contacting device.

One embodiment provides that a longitudinal axis of the respective third section of the first contacting body and of the second contacting body run substantially parallel to the longitudinal axis of the coil arrangement carrier and/or to the end section of the measurement electrodes.

One embodiment provides that a contacting device be configured to connect the measurement electrodes to the measurement circuit and the contacting bodies to the operating circuit.

One embodiment provides that the contacting device be designed as a printed circuit board, which has contact terminals,
wherein two contact terminals are formed to complement the end sections of the two measurement electrodes and are configured to electrically connect the end sections of the measurement electrodes to the measurement circuit,
wherein two contact terminals are formed to complement the third sections of the two contacting bodies and are configured to electrically connect the third sections of the two contacting bodies to the operating circuit,
wherein the contacting device is arranged in a form-fitting manner on the front body.

The circuit board can have electronic components of the measurement circuit and/or the operating circuit. Until now, coils and measurement electrodes have been individually wired and soldered to the measurement and/or operating circuit.

One embodiment provides that the front body have at least one elevation for fastening the front body when the coil wire is being wound.

For the automated winding of the coil wire onto the coil arrangement carrier, fastening surfaces are required for holding the coil arrangement carrier during winding. It is advantageous if the front body has an elevation which serves as a fastening surface and via which the coil arrangement carrier can be fastened to a holder of the winding system.

The method according to the invention for producing a field system of a magnetically-inductive flow meter, in particular the magnetically-inductive flow meter according to the invention, comprises the production steps of:
providing a core and a mold cavity,
wherein the mold cavity has a receptacle for in each case one of the contacting bodies,
arranging the contacting bodies in the respective receptacles;
forming a cavity between core and mold cavity by bringing together the core and the mold cavity;
filling the cavity and encapsulating the contacting bodies with a casting compound forming the front body and the coil arrangement carriers; and
curing the casting compound.

During the production of the front body and the coil arrangement carrier, co-casting a section of the contact-making bodies will reduce the number of assembly steps and provides an adequate fastening of the contacting body or of the contacting body arrangement in the coil arrangement carrier.

An injection-molding process is suitable as a particularly advantageous method for filling the cavity.

Advantageous embodiments of the invention are the subject matter of the dependent claims.

One embodiment provides the following method steps:
winding the coil wire onto the first section of the first contacting body;
winding the coil wire around the coil arrangement carrier along a first direction substantially parallel to the longitudinal axis of the coil arrangement carrier;
winding the coil wire around the coil arrangement carrier along a second direction which is oriented opposite to the first direction;
winding the coil wire onto the first section of the second contacting body.

One embodiment provides that the first contacting body and/or the second contacting body be shaped into a final state by means of bend-forming when the core and the mold cavity are brought together,
wherein, in the final state, the longitudinal axis in the first section of the first contacting body in the cross-sectional plane of the coil arrangement carrier runs substantially perpendicular to the longitudinal axis of the coil arrangement carrier, and the longitudinal axis of the third section of the first contacting body runs substantially parallel to the longitudinal axis of the coil arrangement carrier.

When the casting molds are brought together, in particular when the core is being introduced into the mold cavity, there is sufficient kinetic energy to deform the contacting bodies. It is therefore advantageous if the contacting bodies are not or are only partially pre-bent, and are not reshaped, in particular bent, until the core has been introduced into the mold cavity.

BRIEF DESCRIPTION OF THE DRAWINGS

The invention is explained in greater detail with reference to the following figures. The following are shown.

DETAILED DESCRIPTION

Figure 1:
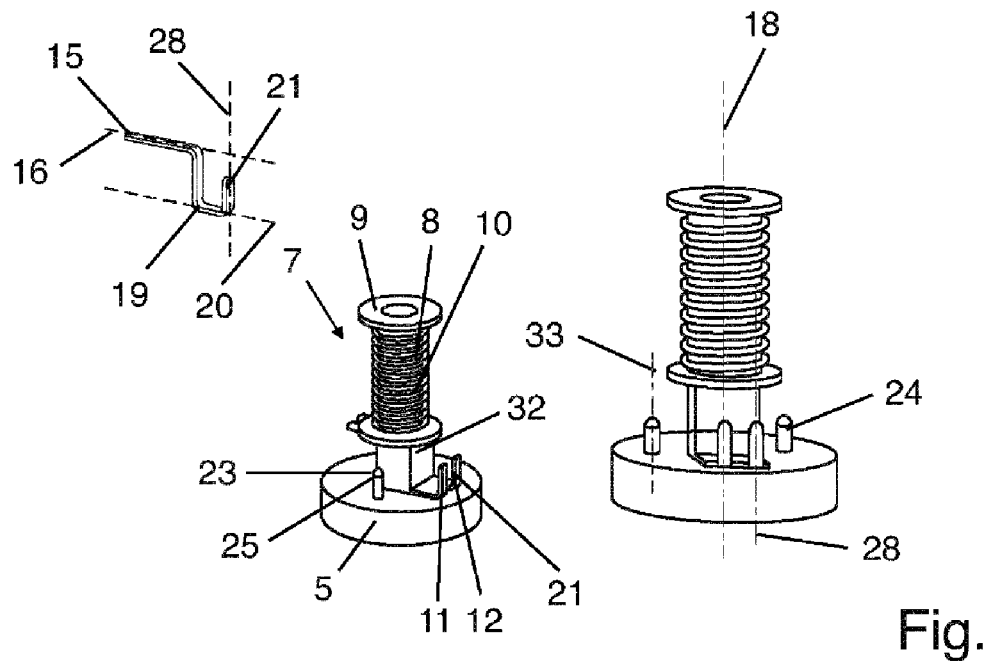
FIG. 1 shows two views of an embodiment of the front body and coil arrangement carrier according to the present disclosure.

FIG. 1 shows two views of an embodiment of the front body and coil arrangement carrier according to the invention. The front body 5 has a cylindrical base body. In addition, the front body 5 has two end faces, wherein a first end face is medium-contacting, and a second end face is located in the interior of the housing 3. A measurement electrode arrangement 6 is arranged in the front body 5. The measurement electrodes 23, 24 extend from the first end face to the second end face, through the front body 5. The measurement electrodes 23, 24 each have a medium-contacting front section and an end section 25 which extends into the interior of the housing 3. The measurement electrodes 23, 24 each have a longitudinal axis 33 which runs parallel to the longitudinal axis of the coil arrangement carrier 9 and intersects the second end face perpendicularly. According to the embodiment shown, the measurement electrodes 23, 24 are in each case designed as a pin electrode.

The front body 5 is formed monolithically with a coil arrangement carrier 9. According to the depicted embodiment, a center piece 32 connected monolithically to the front body 5 and to the coil arrangement carrier 9 is arranged between the front body 5 and the coil arrangement carrier 9. The coil arrangement carrier 9 has a hollow-cylindrical basic shape. The winding surface onto which the coil wire 10 is wound is bounded by two disks in both longitudinal directions of the coil arrangement carrier 9. A coil arrangement 8 is attached to the coil arrangement carrier 9. According to the embodiment shown, the coil arrangement 8 comprises exactly one coil.

The coil wire ends of the coil wire 10 are connected to two contacting bodies 11, 12, in particular to the first sections 15 of the contacting bodies 11, 12. The contacting bodies 11, 12 are shaped such that the respective longitudinal axes of the first section 15 of the contacting bodies 11, 12 lie in a common cross-section of the coil arrangement carrier 9. In addition, the contacting bodies 11, 12 are shaped such that a second section 19 is inclined to the longitudinal axis of the coil arrangement carrier 9, and the longitudinal axis 28 of a third section 21 runs parallel to the longitudinal axis 18 of the coil arrangement carrier 9. The contacting bodies 11, 12, in particular the respective third section 21 of the contacting bodies 11, 12, are partially encapsulated by the polymer matrix forming the coil arrangement carrier 9. In the embodiment shown, the second section extends into the center piece 32. The third section 21 extends from the second end face of the front body 5 in the direction of the interior of the housing 3.

A separately depicted contacting body has, in dashed lines, the individual longitudinal axes 16, 20, 28 of the three sections 15, 19, 21.

Figure 2:
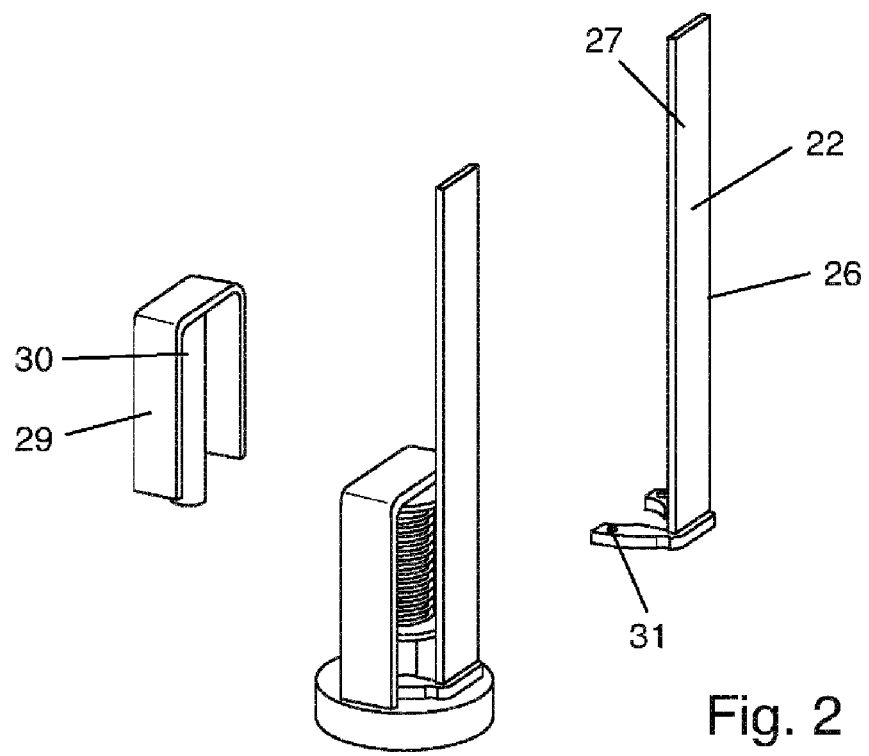
FIG. 2 shows a side view of the configuration of the front body, with mounted coil core, field return, and contacting body.

FIG. 2 shows a side view of the configuration of the front body 5 and of the coil arrangement carrier 9 with mounted coil core 30, field return 29, and contacting device 27. The front body 5 shown has all essential features of FIG. 1. In addition to the coil arrangement carrier 9 and to the front body 5, a field return 29, a coil core 30, which extends through the cross-sectional areas of the coil, and a contacting device 27, are shown.

In addition, FIG. 2 shows a coil core 30 with a field return 29 and a contacting device 27, wherein the contacting device 27 has contact terminals 31 for the measurement electrodes and the contacting bodies, for connecting precisely these to a measurement and/or operating circuit 22, 26. The coil core 30 is cylindrical, and the field return 29 has the basic shape of a double-bent strip. Field return 29 and coil core 30 can be formed monolithically or consist of at least two, assembled, individual components. The contacting device 27 is formed from a circuit board and comprises the measurement and/or operating circuit 22, 26.

Figure 3:
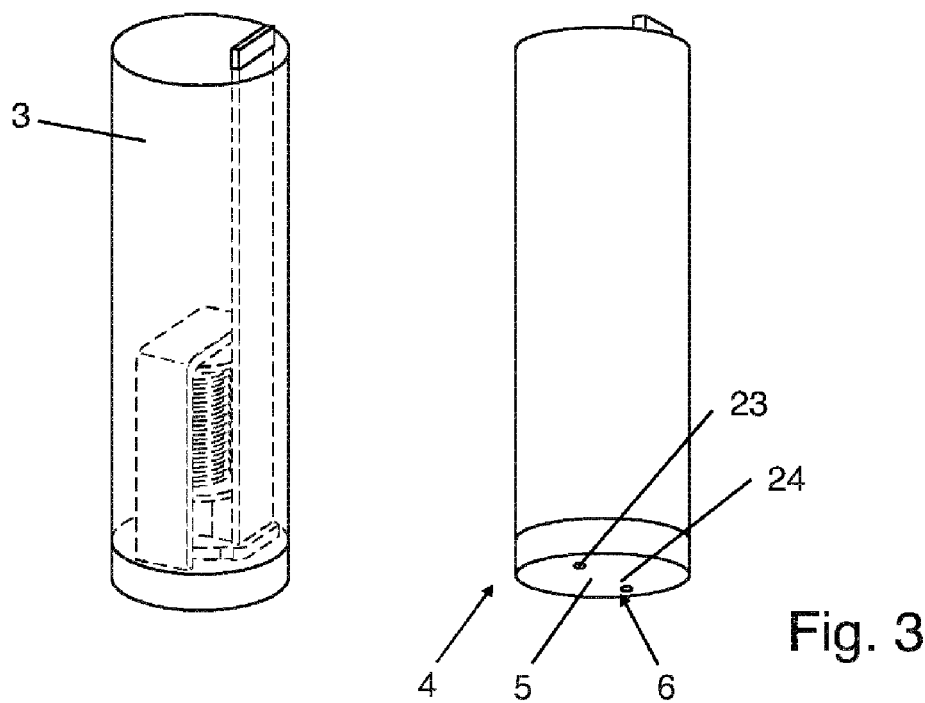
FIG. 3 shows two views of the embodiment of the front body according to the present disclosure mounted on a housing.

FIG. 3 shows two views of the embodiment of the front body 5 according to the invention mounted on the end face 4 of a housing 3. The housing 3 has a cylindrical basic shape. The housing 3 can be cast with a casting compound for affixing the field system. The front body 5 of the embodiment shown has a measurement electrode arrangement 6 with two measurement electrodes 23, 24 lying along a diameter of the front body 5. The front body 5 is pressed in a medium-sealing manner into the housing 3 or, with a seal, is arranged, in particular pressed, in a medium-tight manner.

Figure 4:
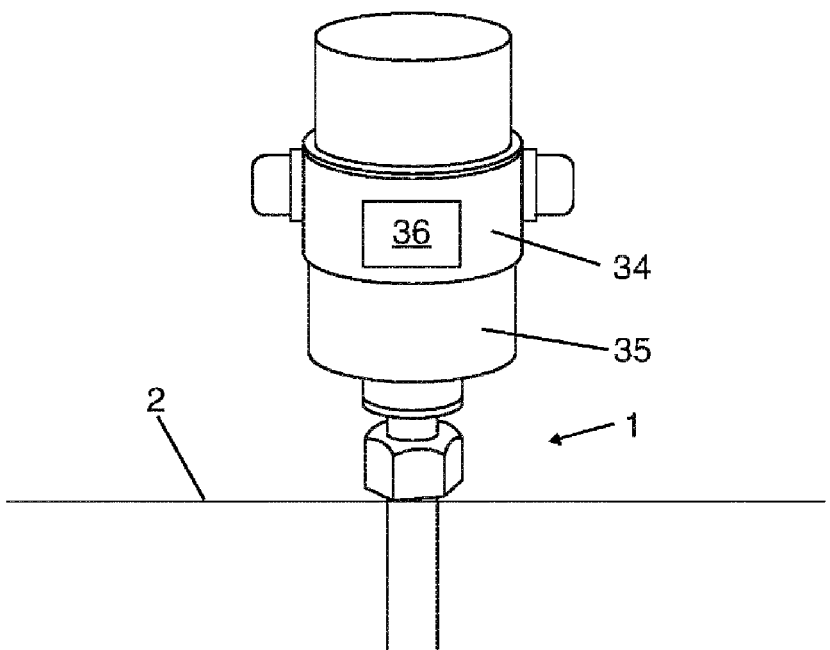
FIG. 4 shows a magnetically-inductive flow meter according to the present disclosure installed in a pipeline.

FIG. 4 shows a magnetically-inductive flow meter 1 according to the invention installed in a pipeline 2. A transmitter with an evaluation circuit 34 and a transmitting unit 35 is connected to the magnetically-inductive flow meter 1. Optionally, the transmitter can have a display 36.

Figure 5:
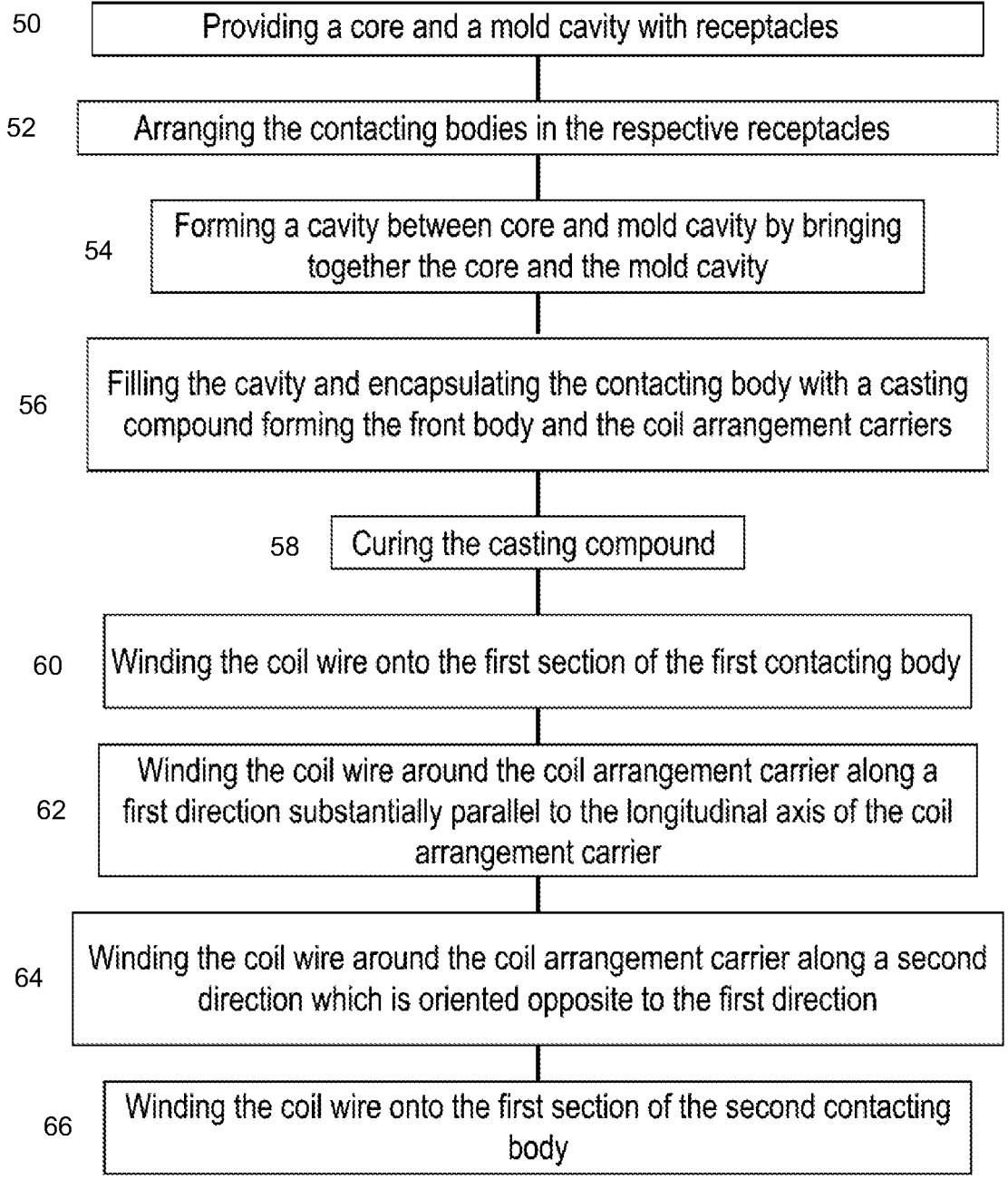
FIG. 5 shows a flowchart of an embodiment of the method according to the present disclosure for producing a front body.

FIG. 5 shows a flowchart of an embodiment of the method according to the invention for producing the field system, with the following method steps:

Providing a core and a mold cavity, wherein the mold cavity has a receptacle for in each case one of the contacting bodies (box 50);

Arranging the contacting bodies in the respective receptacles, wherein the contacting bodies are either preformed, partially preformed, or bent into the final shape when the core is being inserted into the mold cavity (box 52);

Forming a cavity between core and mold cavity by bringing together the core and the mold cavity (box 54);

Filling the cavity and enclosing the contacting body in a casting compound forming the front body and the coil arrangement carriers, in particular by an injection-molding process (box 56);

Curing the casting compound (box 58);

Winding the coil wire onto the first section of the first contacting body (box 60);

Winding the coil wire around the coil arrangement carrier along a first direction substantially parallel to the longitudinal axis of the coil arrangement carrier (box 62);

Winding the coil wire around the coil arrangement carrier along a second direction which is oriented opposite to the first direction (box 64); and Winding the coil wire onto the first section of the second contacting body (box 66).

According to a further embodiment, the first contacting body and/or the second contacting body is shaped into a final state by means of bend-forming when the core and the mold cavity are brought together, wherein, in the final state, the longitudinal axis in the first section of the first contacting body in the cross-sectional plane of the coil arrangement carrier runs substantially perpendicular to the longitudinal axis of the coil arrangement carrier, and the longitudinal axis of the third section of the first contacting body runs substantially parallel to the longitudinal axis of the coil arrangement carrier.

The invention claimed is:

1. A magnetically-inductive flow meter for insertion into a pipeline through which a medium flows and for determining a flow-rate-dependent measured variable induced in the medium, comprising:
    a housing,
    wherein, on an end face of the housing, a front body is arranged which seals the housing at the end face;
    a measurement electrode arrangement for forming a galvanic contact with the medium and for tapping an induced voltage in the flowing medium;
    a field system for generating a magnetic field passing through the end face of the housing,
    wherein the field system is arranged in the housing,
    wherein the field system comprises a coil arrangement,
    wherein the coil arrangement comprises a coil arrangement carrier for winding a coil wire around,
    wherein the coil arrangement carrier and the front body are formed monolithically.

2. The magnetically-inductive flow meter according to claim 1,
    wherein the coil arrangement has a contacting body arrangement,
    wherein the contacting body arrangement comprises a first contacting body and a second contacting body,
    wherein a first coil wire end of the coil wire is connected to a first section of the first contacting body,
    wherein a second coil wire end of the coil wire is connected to a first section of the second contacting body.

3. The magnetically-inductive flow meter according to claim 2,
    wherein the respective first section of the first contacting body and of the second contacting body has a longitudinal axis which lies in a cross-sectional plane of the coil arrangement carrier.

4. The magnetic-inductive flow meter according to claim 2,
    wherein the first contacting body and the second contacting body have a second section which is connected in a form-fitting manner to the coil arrangement carrier and is preferably surrounded by the coil arrangement carrier.

5. The magnetically-inductive flow meter according to claim 4,
    wherein the first contacting body and the second contacting body in the second section each have a longitudinal axis which is inclined to the longitudinal axis of the first section.

6. The magnetically-inductive flow meter according to claim 5,
    wherein the first contacting body and the second contacting body have a third section for contacting the coil wire with an operating circuit.

7. The magnetically-inductive flow meter according to claim 1,
    wherein the measurement electrode arrangement is arranged in the front body,
    wherein the measurement electrode arrangement has two measurement electrodes, each of which has an end section for connecting the measurement electrodes to a measurement circuit,
    wherein the end section is arranged in the housing.

8. The magnetically-inductive flow meter according to claim 7,
    wherein a longitudinal axis of a respective third section of the first contacting body and of the second contacting body runs substantially parallel to the longitudinal axis of the coil arrangement carrier and/or to the end section of the measurement electrodes.

9. A magnetically-inductive flow meter for insertion into a pipeline through which a medium flows and for determining a flow-rate-dependent measured variable induced in the medium, comprising:
    a housing,
    wherein, on an end face of the housing, a front body is arranged which seals the housing at the end face;
    a measurement electrode arrangement for forming a galvanic contact with the medium and for tapping an induced voltage in the flowing medium;
    a field system for generating a magnetic field passing through the end face of the housing,
    wherein the field system is arranged in the housing,
    wherein the field system comprises a coil arrangement,
    wherein the coil arrangement comprises a coil arrangement carrier for winding a coil wire around,
    wherein the coil arrangement carrier and the front body are formed monolithically,
    wherein the measurement electrode arrangement is arranged in the front body,
    wherein the measurement electrode arrangement has two measurement electrodes, each of which has an end section for connecting the measurement electrodes to a measurement circuit,
    wherein the end section is arranged in the housing,
    wherein a longitudinal axis of a respective third section of the first contacting body and of the second contacting body runs substantially parallel to the longitudinal axis of the coil arrangement carrier and/or to the end section of the measurement electrodes,
    wherein a contacting device is configured to connect the measurement electrodes to the measurement circuit and the contacting bodies to the operating circuit.

10. The magnetically-inductive flow meter according to claim 9,
    wherein the contacting device is designed as a printed circuit board which has contact terminals,
    wherein two contact terminals are formed to complement the end sections of the two measurement electrodes and are configured to electrically connect the end sections of the measurement electrodes to the measurement circuit, wherein two contact terminals are formed to complement the third sections of the two contacting bodies and are configured to electrically connect the third sections of the two contacting bodies to the operating circuit, wherein the contacting device is arranged in a form-fitting manner on the front body.

11. The magnetically-inductive flow meter according to claim 1, wherein the front body has at least one elevation for fastening the front body when the coil wire is being wound.

12. A method for producing a field system of a magnetically-inductive flow meter comprising the production steps of:

providing a core and a mold cavity, wherein the mold cavity has a receptacle for each one of the contacting bodies, arranging the contacting bodies in the respective receptacles;

forming a cavity between core and mold cavity by bringing together the core and the mold cavity;

filling the cavity and encapsulating the contacting bodies with a casting compound forming the front body and the coil arrangement carriers; and curing the casting compound.

13. The method according to claim 12, comprising the method steps of:

winding the coil wire onto the first section of the first contacting body;

winding the coil wire around the coil arrangement carrier along a first direction substantially parallel to the longitudinal axis of the coil arrangement carrier;

winding the coil wire around the coil arrangement carrier along a second direction which is oriented opposite to the first direction;

winding the coil wire onto the first section of the second contacting body.

14. The method according to claim 12, wherein the first contacting body and/or the second contacting body is shaped into a final state by means of bend-forming when the core and the mold cavity are brought together, wherein, in the final state, the longitudinal axis in the first section of the first contacting body in the cross-sectional plane of the coil arrangement carrier runs substantially perpendicular to the longitudinal axis of the coil arrangement carrier, and the longitudinal axis of the third section of the first contacting body runs substantially parallel to the longitudinal axis of the coil arrangement carrier.

* * * * *